United States Patent

Eklöf et al.

[11] 4,020,953
[45] May 3, 1977

[54] APPARATUS FOR UNLOADING PARTICULATE MATERIAL, ESPECIALLY FROM SHIPS

[75] Inventors: Karl Vilhelm Evert Eklöf; Karl August Lennart Tingskog, both of Helsingborg, Sweden

[73] Assignee: AB Siwertell, Bjuv, Sweden

[22] Filed: Mar. 31, 1976

[21] Appl. No.: 672,491

[30] Foreign Application Priority Data
Apr. 7, 1975    Sweden .............................. 7503924

[52] U.S. Cl. .................. 214/14; 198/511; 198/519; 198/590; 212/3
[51] Int. Cl.² ........................................ B65G 67/58
[58] Field of Search ................. 214/14, 15 R, 15 E; 212/3; 198/511, 519, 585, 587, 589, 608

[56] References Cited
UNITED STATES PATENTS 3,640,376   2/1972   Peuker .......................... 198/519 X

FOREIGN PATENTS OR APPLICATIONS 2,308,558   2/1973   Germany .............................. 214/14

*Primary Examiner*—Robert J. Spar
*Assistant Examiner*—George F. Abraham
*Attorney, Agent, or Firm*—Karl W. Flocks

[57] ABSTRACT

An apparatus for unloading particulate material, especially from ships, having an arm system comprising a horizontal conveyor section and a vertical conveyor section, which sections are interconnected in a torsionally rigid but pivotal manner for mutual relative movements in a common plane. The horizontal conveyor section is pivotally and swingably connected to a frame or foundation for raising and lowering of the horizontal conveyor section and for swinging of the complete arm system relative to the frame or foundation. In addition to being pivotally and swingably connected to the frame or foundation the horizontal conveyor section is tiltably connected thereto for inclination of the plane common to the vertical and horizontal conveyor sections relative to a vertical plane.

6 Claims, 4 Drawing Figures

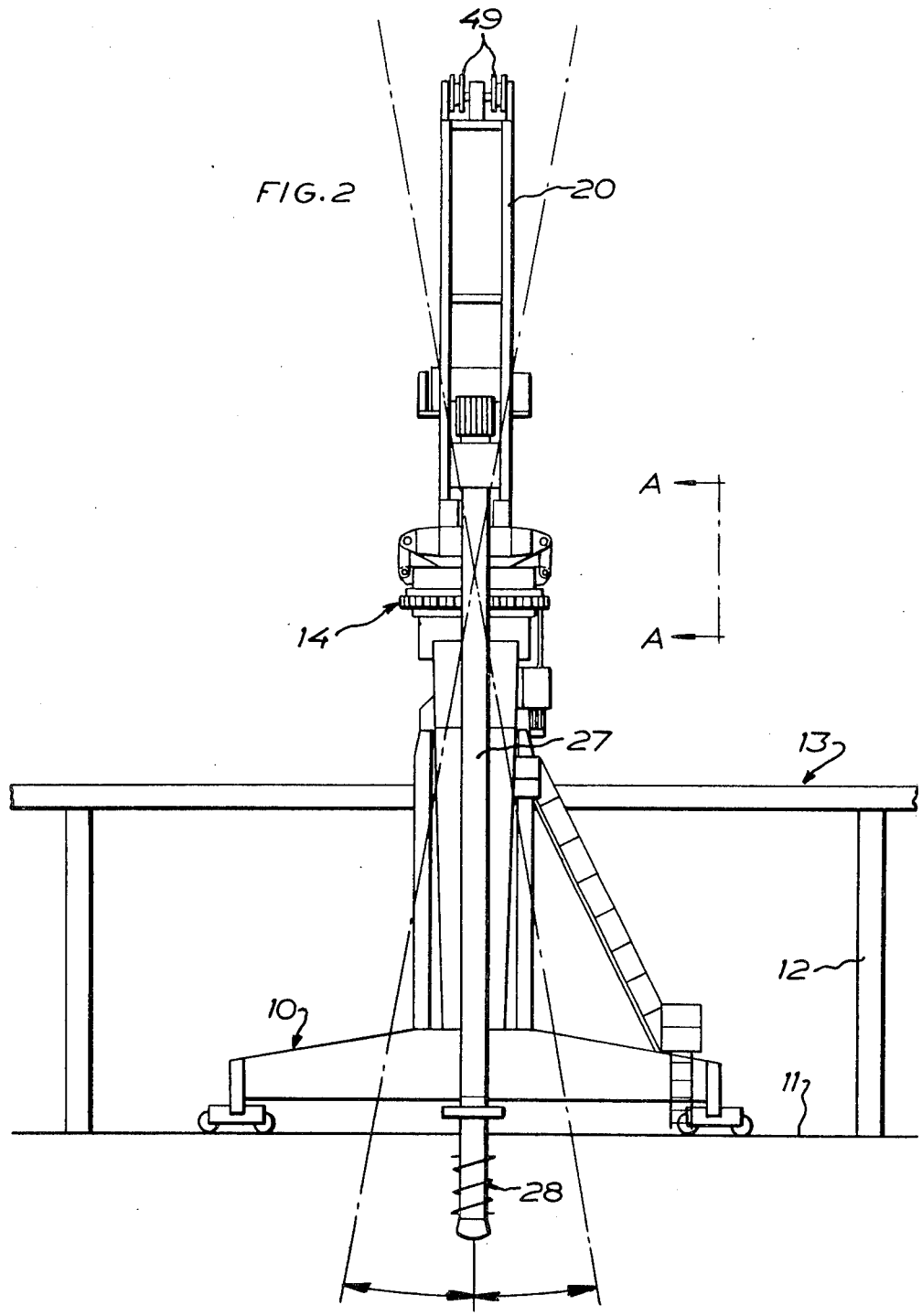

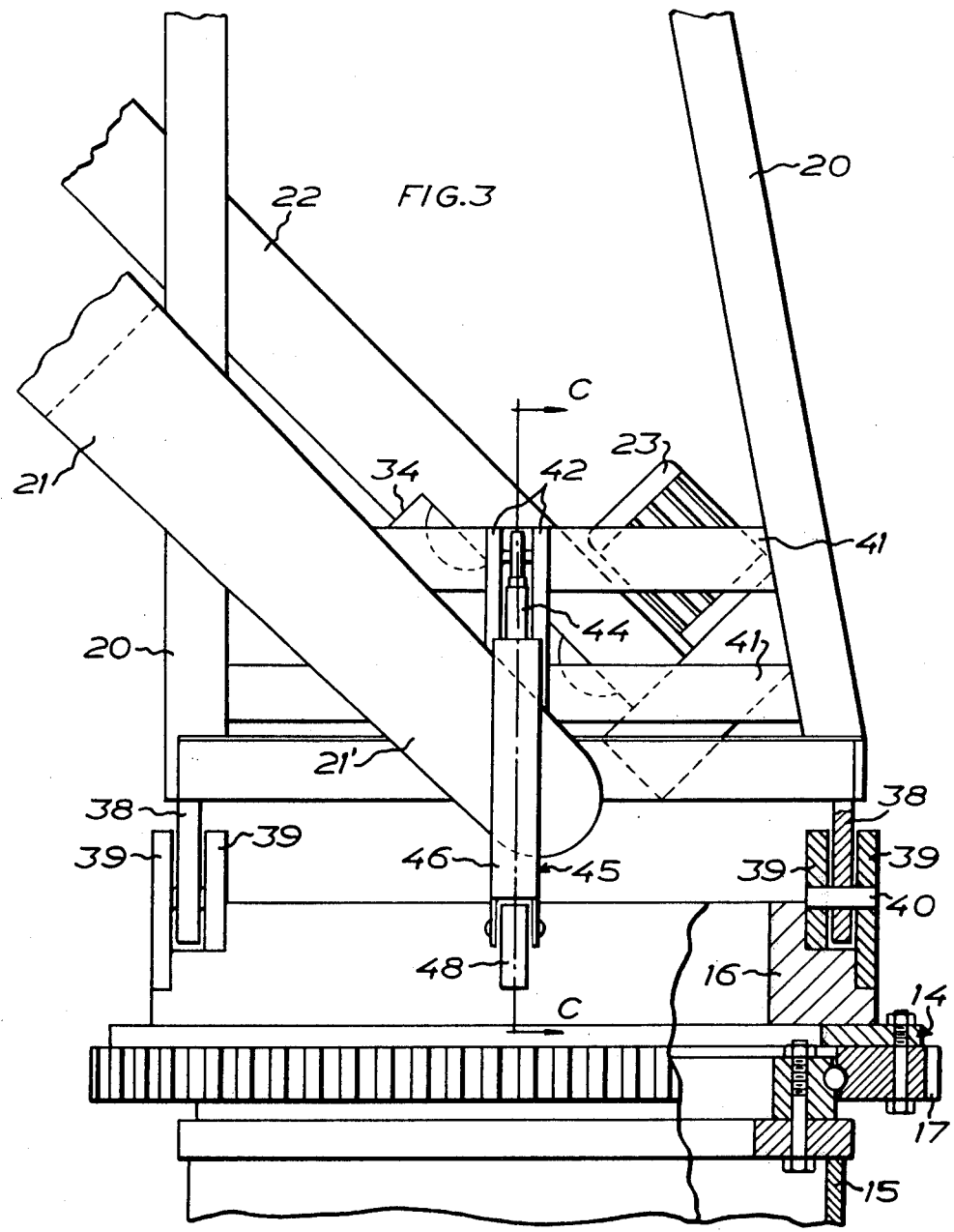

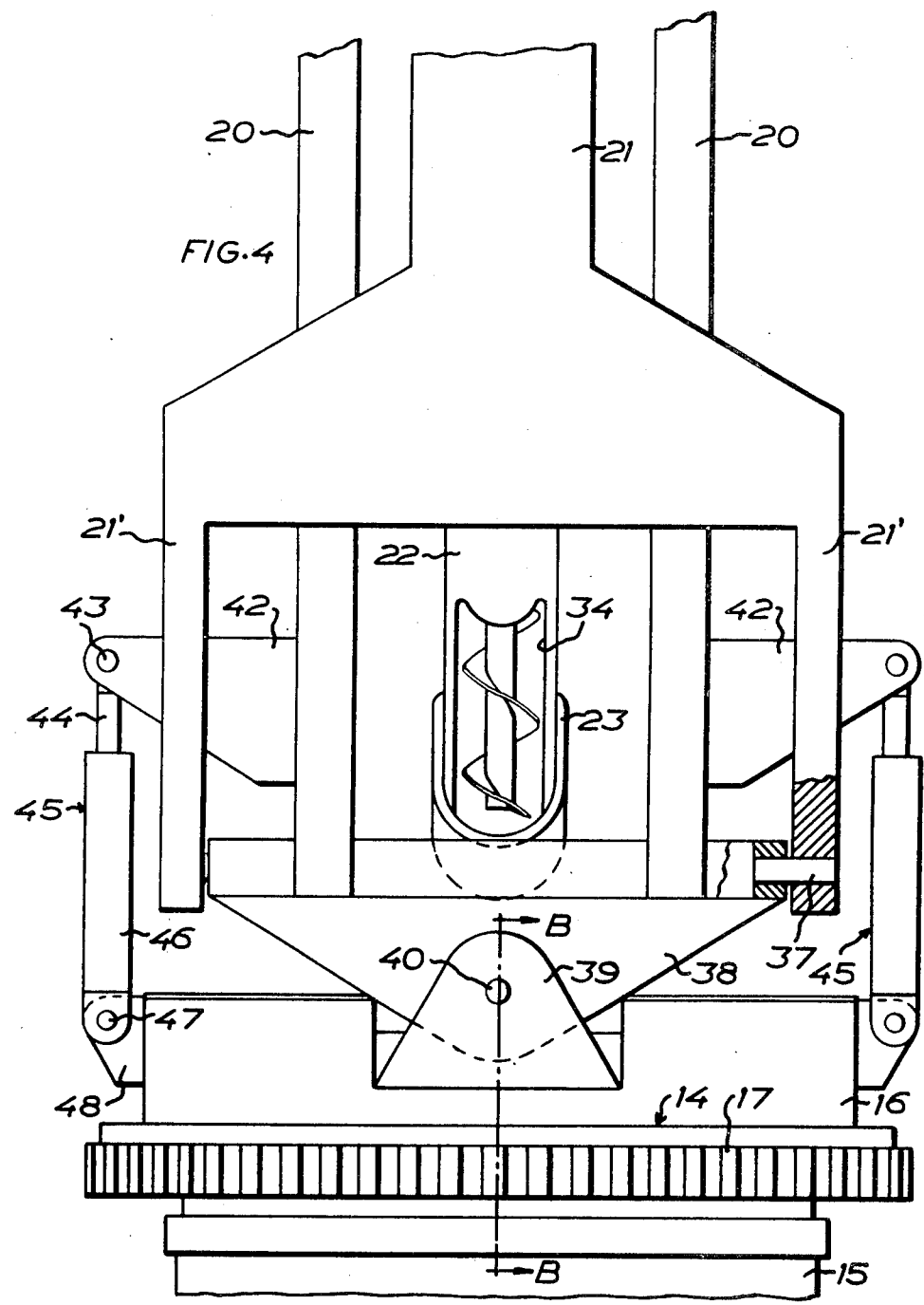

APPARATUS FOR UNLOADING PARTICULATE MATERIAL, ESPECIALLY FROM SHIPS

Canadian Patent 979,388 discloses an apparatus for unloading particulate material especially from ships, and this prior art apparatus comprises a conveyor arrangemang connected to a frame or foundation and including a horizontal conveyor section and a vertical conveyor section connected thereto, which vertical conveyor section is arranged to be swung outwardly from its vertical position and also to be raised and lowered, the horizontal conveyor section being swingably mounted on the frame or foundation in such a way that the vertical conveyor section is raisable and lowerable and also displaceable on an arc having its center at the other end of the horizontal conveyor section, and the vertical and horizontal conveyor sections are interconnected in a torsionally rigid but pivotal manner for mutual relative movements in an common plane.

Such an apparatus is very advantageous in that compared to prior art apparatuses it permits a considerably more complete unloading of for instance the hold of a ship. It has, however, proved that the apparatus described in the above-mentioned Canadian patent in spite of its great mobility was not entirely satisfactory and in certain cases might leave some material in the hold because of obstacles on the ship's deck, such as superstructure, masts etc.

This invention has for its object to eliminate this remaining deficiency of the unloading apparatus described in the above-mentioned patent. To this end, the invention provides an apparatus of the type outlined in the introduction, in which the horizontal conveyor section apart from being swingably connected to the frame or foundation is tiltably connected thereto for inclination of the plane common to the vertical and horizontal conveyor sections with respect to a vertical plane.

According to the invention, the horizontal conveyor section of the conveyor arrangement, apart from being swingably connected to the frame or foundation, shall be tiltably connected thereto for inclination of the plane common to the vertical and horizontal conveyor sections with respect to a vertical plane. By this increased mobility, viz. a tilting of the entire arm system composed of the vertical and horizontal conveyor sections, the flexibility and adaptability of the unloading apparatus to cargo spaces will be considerably improved.

In a further development of the invention it is particularly advantageous to connect the horizontal conveyor section to the frame in a manner similar to a universal joint, that is, the connection of the horizontal conveyor section with the frame contains two axes at right angles to each other. This will make for a simple construction with regard to the devices serving to control the angular position of the horizontal conveyor section relative to the horizontal plane and to control the tilting movement of said arm system relative to the vertical plane. In another advantageous embodiment of the invention the two angularly positioned axes may be arranged on a live ring assembly rotatably mounted on the frame, which implies that the conventinal type of live ring assembly can be retained, while still attaining the advantages associated with the apparatus according to the invention.

A further advantage of the apparatus is that it is equipped with a hydraulic manoeuvering system for controllong the tilting position of the horizontal conveyor section with respect to the frame, said hydraulic manoeuvering system including overflow valves for limitation of those maximum torques in the arm system composed of the horizontal and vertical conveyors, which produce tilting movements of said system. By this arrangement it is possible to avoid excessive and extreme loads on the arm system so that said system and particularly the pivot connection between the vertical and horizontal conveyor sections are not exposed to too large stresses in the event that large lateral forces should act on the lower end of the vertical conveyor section. This hydraulic manoeuvering system can be common to the control of the tilting movement of the vertical and horizontal conveyor sections and of the angular setting of the vertical conveyor section relative to the horizontal conveyor section, the hydraulic manoeuvering system including switching means for tilting and angular setting movements, respectively. In this case it is suitable to arrange the overflow valves between the switching means and the piston and cylinder units for bringing about the tilting and angular setting movements, respectively.

It is of particular advantage to provide the discharge opening of the horizontal conveyor section close to the centers of pivotment of the horizontal conveyor section for tilting movements and raising and lowering movements, respectively, since said discharge opening will thus move but insignificantly in horizontal direction upon manoeuvering of the arm system composed of the vertical and horizontal conveyor sections.

By the tilting or transverse oscillating movement which has been made possible by the present invention, surfaces below ship deck portions can be reached to an increased extent despite the existence of masts, deckhouses and other obstacles on ship decks. Moreover, the manoeuverability increases by the possibility of reaching, without shifting the frame or the gantry, more locations than what is possible with the use of an unloading apparatus devoid of the possibility of tilting or transverse oscillating movements. Moreover, the manoeuverability will be increased since one and the same location can be reached in several different ways.

The invention reduces the risks of damage to the unloading apparatus because of the greater possibilities of the apparatus to yield when the apparatus is driven against masses of the particulate material in the ship's hold and upon collapse of such masses of material. The tilting movement is very advantageous considering that the moment of inertia at tilting is considerably less that the moment of inertia arising if the entire apparatus would rotate about a vertical axis of rotation, for instance a live ring assembly.

The apparatus according to the invention is also advantageous inasmuch as the arm system composed of the horizontal and vertical conveyor sections and being the component part that produces overturning moments for which the frame or gantry will have to be dimensioned and which determine wheel pressures etc., does not increase in weight by tiltability. Moreover, a much less problematical conveyance of material is obtained since the entire conveyor system partakes in the movement, whereby the points of transfer between different conveyor portions will be simple. Tilting takes place about a line passing near the center of gravity of the system, and therefore relatively small manoeuvering forces are required. The mounting of the apparatus according to the invention will also be simple.

An embodiment of the invention will be more fully described hereinbelow with reference to the accompanying drawings in which:

FIG. 2 is a view of the apparatus as seen from the left in FIG. 1, the ship having been removed;

FIG. 3 is a view on line A—A in FIG. 2, certain parts being broken away in a section substantially corresponding to line B—B in FIG. 4;

FIG. 4 shows the details illustrated in FIG. 3 as seen from the left and certain parts in section substantially on line C—C in FIG. 3.

Figure 1:
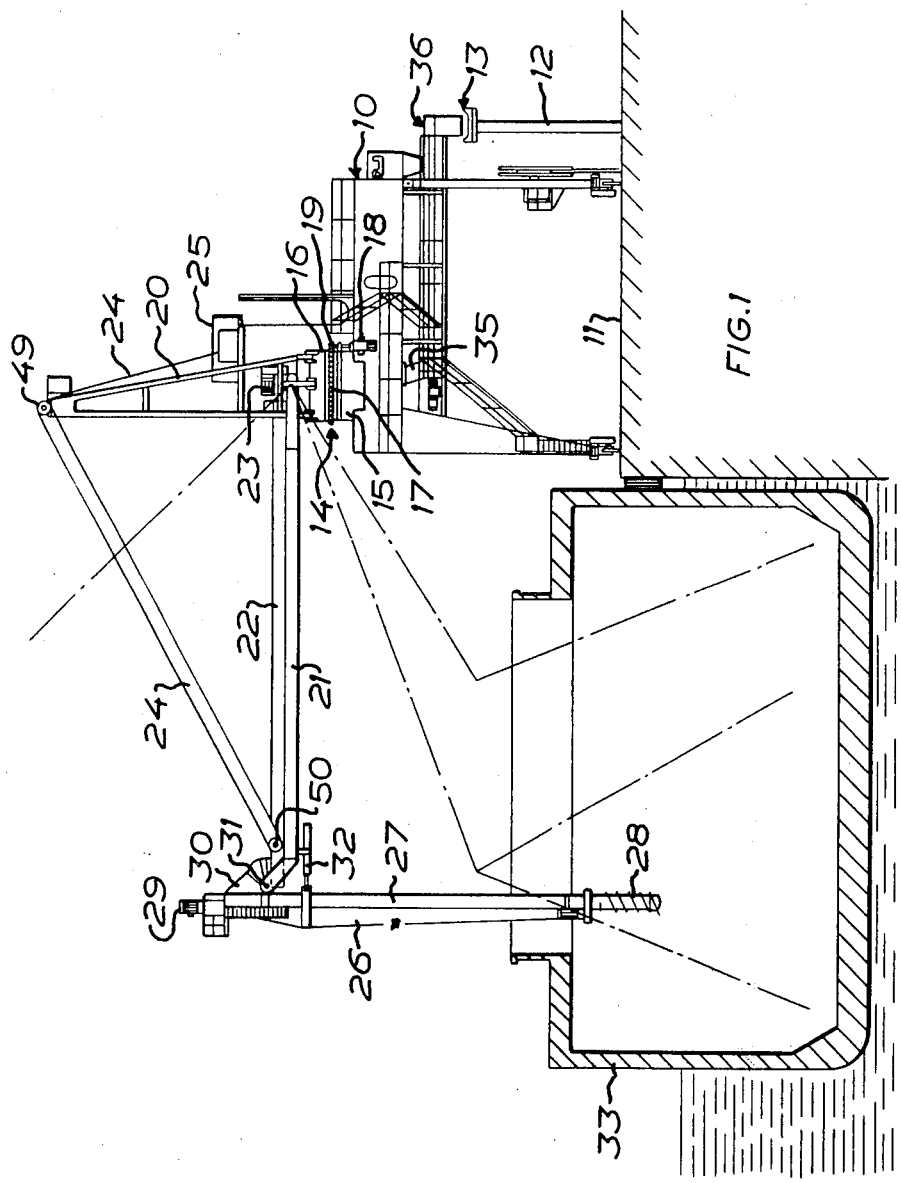
FIG. 1 shows an example of an apparatus designed in conformity with the invention as a portal revolving crane, FIG. 1 being a schematical vertical cross section of a ship being unloaded, a quay and a conveyor belt running along the quay.

As will appear from FIGS. 1 and 2, the apparatus according to the invention can be arranged on a frame 10 in the form of a gantry traveling along tracks (not shown) on a quay 11. On this quay there is provided a conveyor belt 13 which is mounted on columns 12 and along which the gantry 10 can be caused to travel. Mounted on the gantry is a live ring assembly 14 which is conventionally formed as a large heavy-duty ball-bearing the inner ring of which is fixed to a stationary annular portion 15 of the gantry and the outer ring of which is fixed to an annular part or ring member 16 and has a gear rim 17 which is driven by a drive motor 18 via a pinion 19.

The rotary ring member 16 serves as a rotary crane foundation and carries a tower 20 to the lower end of which a swingable (raisable and lowerable) crane arm or jib 21 is connected. Said jib 21 carries a horizontal conveyor 22 which in the embodiment illustrated is formed as a screw conveyor having a drive motor 23. The position of the jib with respect to the horizontal line can be controlled with the aid of a rope winch 24, the rope drum and motor 25 of which are mounted on the tower 20 and partake in the movements thereof.

The crane arm or jib 21 is designed as a torsionally rigid structure, preferably in the shape of a box beam with fork-shaped ends. At the outer end the jib 21 is pivoted to a likewise torsionally rigid arm structure 26 which can also be in the form of a torsionally rigid box beam structure. Said arm 26 carries a vertical conveyor 27 which in this embodiment is also formed as a screw conveyor and which at the lower end preferably has feeding means 28 (for instance according to U.S. Pat. No. 3,569,751). The vertical conveyor 27 has a drive motor 29 mounted on the arm 26 and is connected to the horizontal conveyor 22 via a transfer channel 30 so that a dustproof transfer of material from the conveyor 27 to the conveyor 22 is rendered possible.

The two arms 21 and 26 are interconnected in a torsionally rigid but pivotal manner by means of a joint 31 so that the arms 21 and 26 are swingable relative to one another in an plane common to them. For adjusting the angle between the two arms 21 and 26 there is provided a drive 32 in the form of a hydraulic piston and cylinder unit.

By rotating the ring member or crane foundation 16 with respect to the gantry 10 the jib 21 can thus be swung horizontally, and with the use of the rope winch 24 the angular position of the jib 21 relative to the horizontal plane can be varied, whereby the height position of the vertical conveyor 27 is varied. Since the angle between the vertical conveyor 27 and the horizontal conveyor 22 can be varied with the aid of the drive 32 it is possible to reach a very great proportion of the material in the hold of a ship 33, which is very schematically shown in FIG. 1. Some of the conceivable setting positions of the two conveyors are shown by dash and dot lines.

The outlet 34 of the horizontal conveyor (see FIGS. 3 and 4) is arranged above the crane foundation 16 which has been formed as a ring member in order that the material discharged from the conveyor 22 may pass downwards through the crane foundation and the live ring to the receiving means 35 of a transverse conveyor 36 which is placed in the gantry 10 to convey the material to the conveyor belt 13 on the quay.

FIGS. 3 and 4 show more in detail how the jib 21 is connected to the tower 20 and how the tower 20 is connected to the ring member 16. As will appear from FIGS. 3 and 4 the jib 21 is fork-shaped at the end connected to the tower 20 so that the two limbs 21 of the jib are mounted in journals 37 on either side of the tower 20. The jib 21 is thus connected to the tower in a torsionally rigid manner although the jib can be swung about a substantially horizontal axis extending through the journals 37. At the lower end the tower 20 is provided with a downwardly extending metal sheet or bracket 38 which extends downwardly between bearing lugs 39 which are rigidly fastened to the ring member 16. A journal 40 extends through the components 38 and 39 and makes it possible for the tower 20 to be inclined or tilted relative to the vertical. In the embodiment illustrated said inclination or tilting can be effected up to a maximum value of about 10° in each direction from the vertical, as is illustrated in FIG. 2.

To make an inclination of the tower 20 relative to the ring member 16 possible, i.e. a tilting of the arm system 21, 26, the tower is provided at its lower end with rigidly fastened crossbeams 41 which support two parallel protruding bearing brackets 42. At the outer ends these bearing brackets are pivotally connected by means of journal 43 to a piston rod 44 of a hydraulic piston and cylinder unit 45, the cylinder of which is pivoted by means of a journal 47 to a bearing lug 48 rigidly fastened on the ring member 16. As the arm or jib 21 is connected to the ring member 16 via two relatively perpendicular shafts 37, 40 the connection between the arm or jib 21 and the ring member 16 is similar to a universal joint. As a result, the arm 21 cannot only be raised and lowered by pivotment about the journals 37 but also laterally tilted by swinging movement about the journals 40. As the arms 21 and 26 are interconnected in a torsionally rigid manner by means of the joint 31, it is possible by said tilting movement of the arm 21 to bring about an inclination of the plane common to the horizontal and vertical conveyors. In the embodiment illustrated said inclination or tilting can amount to about 10° in either direction (see FIG. 2),.

As it has been possible to place the discharge opening 34 of the horizontal conveyor 22 close to the pivot axes 37, 40 establishing connection between the arm 21 and the ring member 16, the opening 34 will not move very much when the position of rotation of the ring member 16 is changed relative to the portion 15, or when the arm 21 is swung about the journals 37, or when the arm 21 is tilted by tilting of the tower 20 about the journals 40. It will thus be possible, within broad limits, to alter the position of the feeding means 28 of the vertical conveyor without resorting to complicated constructions for transferring the material from the discharge opening 34 to the receiving means 35 of the transverse conveyor 36.

As the entire tower 20 partakes in the tilting movement about the journals 40 the weight of the tower will balance a great proportion of the weight of the vertical conveyor, which is highly advantageous because the tilting movement can thus be brought about by expenditure of small forces and little energy. Another important advantage is the simple rope arrangement in the rope winch 24, implying that the pulleys 49, 50 in the tower and on the crane arm or jib will always be parallel irrespective of the tilting position of the tower 20 and the vertical conveyor 27.

Overflow valves should suitably be inserted in the hydraulic manoeuvering system for changing the tilting position of the arm system and the angle at which the arms are set. These overflow valves allow a laterally directed force sufficient to enable the feeding means 28 of the vertical conveyor to dig into the particulate material, but limit the maximum tilt-producing or angle-changing outer force to which the arm system 21, 26 may be subjected without being moved out of the position in which it has been set. Such overflow valves will prevent damage to the arm system 21, 26 for instance upon cave in of the particulate material in a ship's hold. In fact, particulate material transported in ships will often be heavily compacted in transit and thus for instance bulk cement may be so heavily compacted in the hold as to form on unloading vertical walls several meters in height. When these walls suddenly cave in it is advantageous that the arm system yields, as this prevents the formation of excessively high stresses in the structure.

According to the invention, it is further advantageous to provide a common hydraulic system for the piston and cylinder units 45 and 32; in this case the overflow valves serving as safety valves are connected between the units 45 and 32 and a switching valve for switching between said units.

In the embodiment illustrated the conveyor arrangement comprises two interconnected feed screw conveyors for respectively horizontal and vertical conveyance of the material, which deliver the material to a further conveyor system for continued conveyance to a store or place of consumption. The conveyor arrangement can, however, also be formed as a pneumatic conveyor, in which case the vertical and horizontal conveyor sections 27 and 22, respectively, are two interconnected portions of the same pneumatic conveyor or suction conveyor.

Another possible variation of the described embodiment is to arrange the live ring assembly, the tower and the arm system having the vertical and horizontal conveyor sections on an stationary frame or foundation, which means that the apparatus according to the invention need not necessarily be arranged in a mobile frame in the form of a gantry.

What we claim and desired to secure by Letters Patent is:

1. Apparatus for unloading particulate material, especially from ships, comprising supporting means (10, 16), a vertical conveyor section (27), a horizontal conveyor section (22), said vertical and horizontal conveyor sections (22, 27), forming an arm system, means (14) for swingably mounting this arm system on said supporting means (10, 16), means (31, 32) interconnecting said vertical and horizontal conveyor sections (22, 27) in a torsionally rigid but pivotal manner for mutual relative movements in a common plane, means (37) for pivotally mounting said horizontal conveyor section (22) on said supporting means (10, 16), and means (38-40, 45) for mounting said horizontal conveyor section (22) on said supporting means (10, 16) in a tiltable way for inclination of the plane common to said vertical and horizontal conveyor sections (22, 27) relative to a vertical plane.

2. The apparatus of claim 1, wherein said means (37) for pivotally mounting said horizontal conveyor section (22) on said supporting means (10, 16) and said means (38-40) for mounting said horizontal conveyor section (22) on said supporting means (10, 16) together form a universal joint.

3. The apparatus of claim 1, wherein said horizontal conveyor section (22) is connected to a ring member (16) rotatably mounted on said supporting means (10).

4. The apparatus of claim 1, wherein said horizontal conveyor section (22) has its discharge opening (34) arranged near the pivoting centers (37, 40) of said horizontal conveyor section for tilting and raising and lowering movements, respectively.

5. The apparatus of claim 1, further comprising a tower structure (20), said horizontal conveyor section (22) being connected to the lower end of said tower structure in a torsionally rigid but pivotal manner, said tower structure being at its lower end tiltably connected to said supporting means (10, 16) and carrying a device (24, 25) for setting the angular position of said horizontal conveyor section (22) relative to the horizontal plane, said tower structure thus partaking in the tilting movements of said horizontal and vertical conveyor sections (22, 27) relative to a vertical plane.

6. Apparatus for unloading particulate material, especially from ships, comprising supporting means (10, 16), a vertical conveyor section (27), a horizontal conveyor section (22), means (31, 32) interconnecting said vertical and horizontal conveyor sections (22, 27) in a torsionally rigid but pivotal manner for mutual relative movements in a common plane, said horizontal and vertical conveyor sections forming an arm system, means (14) swingably mounting said horizontal conveyor section (22) on said supporting means (10), means (37) pivotally mounting said horizontal conveyor section (22) on said supporting means (10) for raising and lowering thereof, and means (38-41) for mounting said horizontal conveyor section on said supporting means in a tiltable way for inclination of the plane common to said vertical and horizontal conveyor sections relative to a vertical plane.

* * * * *